Moses A. Johnson's.

Improvement in Insoles, for Boots and Shoes.

No. 4,547

Reissued Sep. 12, 1871.

Witnesses.

C. E. Wilson

Edmund Masson.

Moses A. Johnson.

By atty. A. B. Stoughton

UNITED STATES PATENT OFFICE.

MOSES A. JOHNSON, OF LOWELL, MASSACHUSETTS, ASSIGNOR TO HORACE B. SHATTUCK, OF SAME PLACE.

IMPROVEMENT IN INSOLES FOR BOOTS AND SHOES.

Specification forming part of Letters Patent No. 61,742, dated February 5, 1867; reissue No. 4,547, dated September 12, 1871.

*To all whom it may concern:*

Be it known that I, MOSES A. JOHNSON, of Lowell, in the county of Middlesex and State of Massachusetts, have invented certain new and useful Improvements in Insoles for Boots and Shoes; and I do hereby declare the following to be a full, clear, and exact description of the same, reference being had to the accompanying drawing making a part of this specification, in which—

Figure 1:
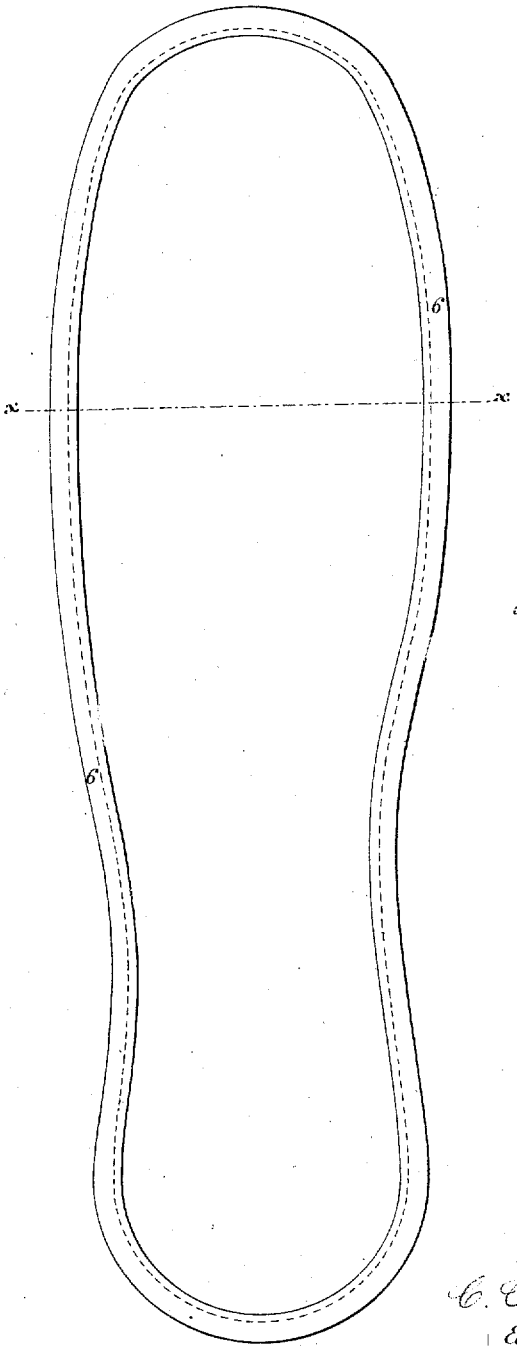
Figure 2:
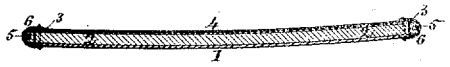

Figure 1 represents a plan of one of the insoles, and Fig. 2 represents a section thereof at the line *x x* of Fig. 1.

The object of my invention is to produce an insole that will be soft to the foot, warm, flexible, and that will not creep, crease, or crimp under the action of the foot in walking; and the nature of my invention consists, first, in a fabric for insoles built up of layers of, first, glazed or water-proofed paper, cloth, or thin leather; second, of felted or sheet-hair; third, of paper; and so on until it is sufficiently thick and elastic, and then topped with Canton-flannel and cloth. And my invention, secondly, consists in an insole composed of layers of paper to make it stiff, and felted or sheet-hair to make it soft and warm, and with a metallic stiffener to prevent it from creeping or creasing under the action of the foot in walking, when said paper, hair, and metallic stiffener are inclosed within an exterior of leather, or paper and cloth. And my invention further consists in an insole composed substantially of one, two, or more sheets of paper, and one or more layers of felted or sheet-hair, and a metallic stiffener, when said paper and hair are inclosed between layers of glazed or water-proofed paper, cloth, or leather, and when said stiffener is laid and secured around the margin of the insole, so as not to be under the foot of the user.

To enable others skilled in the art to make and use my invention, I will proceed to describe the same with reference to the drawing.

The fabric from which the insoles are cut is built up as follows: The under portion 1 may be of glazed or water-proofed paper, cloth, or thin leather; on this a layer, 2, of felted or sheet-hair is placed; on this a layer of paper, 3, and so on, until it is sufficiently thick and elastic, the paper giving firmness to the fabric, and the hair warmth and elasticity, and the top portion, 4, may be of Canton-flannel or cloth. By under and top portions of the fabric is meant such relative positions as used in a shoe.

The object and purposes of the above "build-up" are as follows: The glazed or water-proofed paper, cloth, or leather on the under portion coming in contact, as it does, with leather of the boot or shoe-sole, needs to be of such consistency as not to readily wear out or become soiled from such contact. The imposed or interposed paper is to give the insole consistency or stiffness enough to keep the fabric from creasing or crimping. The felted or sheet-hair is for elasticity and warmth, and the Canton-flannel or cloth on top is to form a smooth and soft surface for the foot of the user. The metallic stiffener is to prevent the insole from creeping or crimping under the action of the feet in walking. Out of a fabric thus built up as described the insoles are cut and then bound with leather, braid, galloon, or other suitable binding, 6, and as the binding is being sewed or otherwise fastened on a wire, 5, or its equivalent, is introduced under it and around the edge of the insole, which keeps the sole in proper shape and position, at the same time that the metal is not under the foot of the wearer, where, by its conduction of heat and susceptibility to cold, and its rigid nature, it is quite objectionable and inconvenient. Previous to stitching or putting on the binding and putting in the wire stiffener, the edge of the fabric or insole may be stitched, so as to prevent the wire from working into or between the layers of which the fabric is composed, or getting out of its proper position.

Cork may be introduced as one of the layers of the fabric, if quite thin, but I prefer woven or felted material of some kind as more suitable and cheaper than cork, and as it is more elastic and yielding to the foot than cork, from its woody nature.

I have represented the stiffener as being in one piece and as extending entirely around the insole. The stiffener may be in pieces and extend only partially around the sole, or at intermediate parts thereof.

Having thus fully described my invention, what I claim is—

1. An insole composed of layers of paper to make it stiff, interposed layers of felted or sheet-hair to make it soft and warm, a bottom composed of paper, glazed or water-proofed, cloth, or leather, a top of Canton-flannel or cloth for exterior wear and finish, and a stiffener to prevent it from creeping under the action of the foot in walking, substantially as described.

2. An insole composed substantially of layers of paper and interposed layers of felted or sheet-hair, and a stiffener, when the layers of paper and of hair are inclosed between a bottom of glazed or water-proofed paper, cloth, or leather, and a top of Canton-flannel or cloth, and when said stiffener is laid and secured around the margin or edge of the insole, as and for the purpose described and represented.

MOSES A. JOHNSON.

Witnesses:
H. DENNETT,
H. B. SHATTUCK,
W. H. CHOATE.

(13.)